Oct. 28, 1958     C. F. NORELLI ET AL     2,857,873
ROTARY VALVE SALVAGE APPARATUS
Filed June 7, 1957
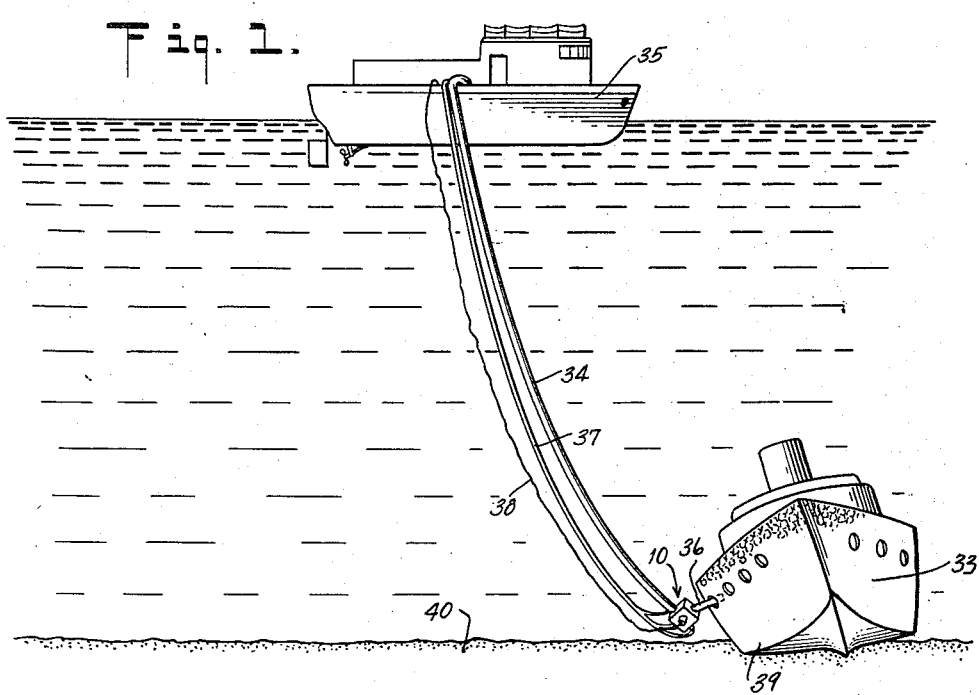
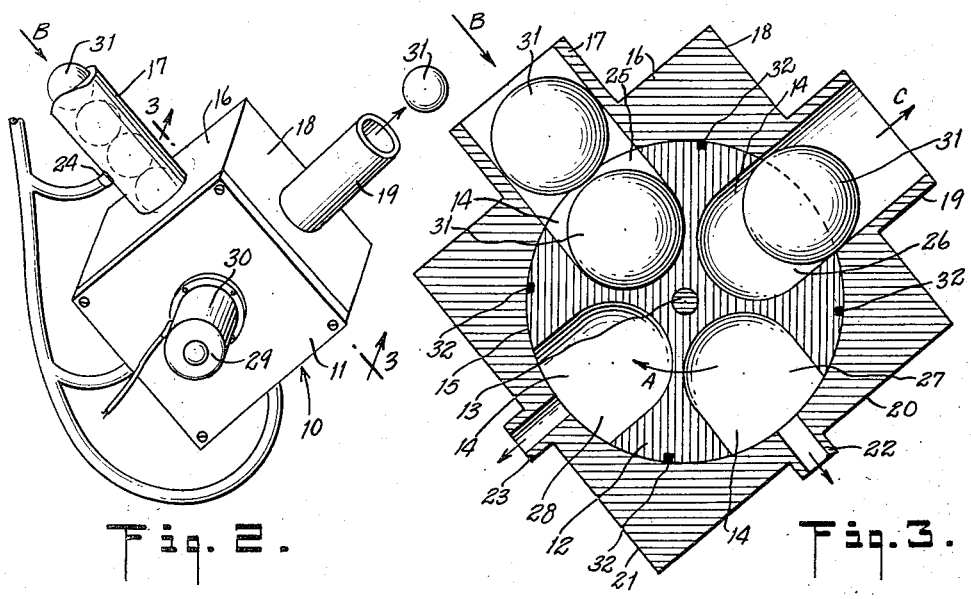
INVENTORS
CLEMENT F. NORELLI
HARRY A. PULIN
BY
Kenyon & Kenyon
ATTORNEYS

United States Patent Office 2,857,873
Patented Oct. 28, 1958

2,857,873

ROTARY VALVE SALVAGE APPARATUS

Clement F. Norelli, Astoria, and Harry A. Pulin, Bronx, N. Y., assignors to Norpul Corporation, New York, N. Y., a corporation of New York Application June 7, 1957, Serial No. 664,260

3 Claims. (Cl. 114—50)

This invention relates to apparatus for use in salvage operations involving the raising of sunken vessels, and more particularly to rotary valve apparatus for introducing buoyant bodies into sunken vessels to displace the water therein and permit raising of such vessels to the surface.

Heretofore various methods have been devised for the salvage of sunken ships but few have been found practicable from either an operational or economic basis. Generally, rather elaborate apparatus was required to effect such methods. In many cases functional limitations were encountered which rendered the apparatus impracticable under certain conditions.

It is an object of the present invention to provide apparatus for use in raising sunken vessels by the introduction of buoyant bodies therein which includes a submersible rotary valve unit adapted for delivery of self-releasing buoyant elements into a sunken vessel.

Another object is to provide such a device which is compact, and operable and even capable of positioning from a surface vessel.

An additional object is to provide such a device which requires no elaborate auxiliary apparatus at the surface of the water.

A further object is to provide such a device which prevents water from backing up through the rotary valve into the supply tube.

Still another object is to provide salvage apparatus which has simplicity of structure and operation.

Briefly the present invention involves rotary valve apparatus for use in raising sunken vessels by the introduction of buoyant bodies therein which comprises a submersible housing which can be positioned against a sunken vessel so as to have access to the interior therof. A rotor is mounted within the housing having four recesses at spaced positions around its periphery and each of the recesses is adapted to receive one of the buoyant bodies at a time. An intake or supply tube is affixed to the housing for delivering said bodies one at a time to said recesses from a surface vessel, and an outlet or delivery tube is affixed to the housing at a position 90 degrees along the rotor periphery from said intake tube for delivering the bodies one at a time from the recesses externally of said housing, i. e. into the sunken vessel. A pair of exhaust means or suction lines are each affixed to the housing at one hundred eighty and two hundred seventy degree positions along said periphery respectively for removing water from the recesses when adjacent either of said positions. Automatic means such as a motor or the like is affixed to said housing for automatically turning the rotor stepwise to advance each of the recesses to successive positions adjacent said intake, outlet and exhaust means.

In conjunction with this apparatus buoyant plastic bodies of materials such as polyurethane foamed plastic or of foamed polystyrene plastic are employed. Such materials provide very lightweight bodies having desired non-corrosive and non-compressibility properties and afford excellent results in various types of salvage operations.

Other objects and features of the invention will appear in the following description and claims, and in the drawings in which:

Fig. 1 is a schematic diagram showing the utilization of the present invention in a salvage operation;

Fig. 2 is an isometric view of the rotary valve apparatus; and

Fig. 3 is a section taken along lines 3—3 of Fig. 2.

Referring now to the drawings, Figs. 2 and 3 show one embodiment of the present invention. It is comprised of a rotary valve designated generally by the reference numeral 10 having a rectangular or box-like housing 11. A rotor 12 is rotatably mounted within said housing 11 on shaft 13 and has four recesses 14 disposed at ninety degree positions around rotor periphery 15 as shown.

Affixed externally to one side 16 of housing 11 is an intake or supply tube 17 which communicates with the interior of said housing 11 and is disposed adjacent said periphery 15 for registration with said recesses 14. Affixed in a similar fashion to the adjacent side 18 of housing 11 is an outlet or delivery tube 19 which likewise communicates with the interior of said housing 11 and is disposed adjacent said periphery 15, at a position ninety degrees along said periphery 15 with respect to said intake tube 17.

Disposed on each of the other two sides 20, 21 of said housing 11, and in opposed relationship with respect to said intake tube 17 and said outlet tube 19, respectively, are exhaust line fittings 22, 23. A similar exhaust line fitting 24 is connected to intake tube.

Thus, as shown in Fig. 3, with one recess 25 in registration with said intake tube 17, the next recess 26, i. e. the one at ninety degrees therefrom in a clockwise direction, is in registration with said outlet tube 19, and the other two recesses 27 and 28 are in line with respective exhaust line fittings 22, 23.

Affixed externally to said housing 11 in a water-tight protective casing 29 is a special electric motor 30 which is connected to rotor shaft 13 to rotate the latter stepwise in a clockwise direction as shown by arrow A in Fig. 3 so that successive of said recesses 14 are moved from a position in registration with, for instance the intake tube 17, then to the outlet tube 19, and so on, being stopped momentarily in each such position for purposes to be described below.

The intake tube 17, outlet tube 19, and recesses 14 are all adapted for receiving spherical shaped buoyant bodies or spheroids 31 as shown in Figs. 2 and 3.

The rotary valve 10 can be constructed of any suitable material such as stainless steel, plastic or the like, and in any event is so weighted that it is easily submersible in salt or fresh water. The housing as assembled should be waterproof at the hydrostatic pressures to be encountered in any given salvage operation, and if necessary the rotor 12 can be provided with gaskets 32 to prevent water leakage from the outlet tube 19 back through to the supply tube 17.

In operation at the site of a sunken vessel 33, the rotary valve housing 11 is assembled as shown in Fig. 1. Any suitable supply line 34 such as a rubber hose or the like interconnects the surface salvage vessel 35 with the intake tube 17, and if necessary a short extension hose or line 36 can be connected to the outlet tube 19. Suction lines 37 interconnect the exhaust fittings 22, 23 and 24 with any conventional suction pump (not shown). Electric power line 38 supplies the necessary power to the motor 30 from the salvage vessel 35.

The rotary valve 10 is positioned alongside the sunken vessel 33 by a diver or other suitable means (even by mere manipulation of the apparatus from the surface in many instances) so that the outlet tube 19 and any extension hose 36 attached thereto projects into the interior of the sunken vessel 33 at a slightly upward angle, and as near the lowest part of said vessel as is practicable.

After the apparatus is assembled and the rotary valve 10 is lowered into the above described position, any water in the supply line 34 is pumped out. About four balls or spheroids 31 are then dropped into the supply line 34 from the surface vessel 35 and they descend in the direction of arrow B (see Fig. 3) into position for the start of the salvage operation.

Referring to Fig. 3, as ball 31 enters recess 25 registered with the intake tube 17. The motor 30 then advances the rotor 12 to the next position ninety degrees in a clockwise direction so that the latter recess is in the position of recess 26 as shown, at the outlet tube 19. At this position sea water enters the outlet tube 19 and the adjacent recess and the ball 31 floats out in the direction of arrow C into the hull interior of the sunken vessel 33. If desired, means may be included in the rotary valve 10 to assist in expulsion of the ball 31 from the outlet tube 19, such as, for example, spring-biased trigger means, electric propulsion means or pneumatic or hydraulic means of any conventional type, but in its simplest embodiment such additional equipment has been found unnecessary.

After the above expulsion step, the recess then passes to successive momentary positions adjacent exhaust line fittings 22 and 23 respectively, where the entrapped sea water picked up by the recess is removed before moving again adjacent the intake tube 17 for receiving the next ball 31. Additional balls may be fed to the supply line 34 from above in tempo with the escaping balls from the rotary valve outlet tube 19 in order to avoid excessive weight on the lowest balls in the tube 19.

Balls 31 are thus fed into the sunken vessel 33 until it is practically filled or at least filled to the extent that sufficient water is displaced therefrom to permit flotation thereof. Suction between the hull 39 of the sunken vessel 33 and the sea bottom 40 is then broken by any conventional well-known means and the vessel thereupon is floated to the surface for reclamation.

Various types of buoyant balls can be utilized in conjunction with the present apparatus. Particularly useful are the foamed plastics such as expanded polystyrene and polyurethanes. One such polystyrene is marketed by the Dow Chemical Company, Midland, Michigan, under the name "Styrofoam" and has buoyancy and water repellency making it highly desirable for marine applications. It is over thirty times lighter than water and has been found in tests to absorb negligible amounts of water.

Nopco Chemical Company, Harrison, N. J., markets a foamed polyurethane under the name "Lockfoam" having similar properties to the expanded polystyrene. The density is five pounds per cubic foot and the material is absorption resistant to both water and lubricating oil. It also has a high compressive strength.

Utilization of such plastic materials with the apparatus of the present invention provides salvage apparatus of relatively low investment and operational cost. The equipment is easily portable and simple to operate. Because of its simplicity and sturdiness of construction operational failures are negligible.

While only one embodiment of the present invention has been shown and described above, it is to be understood that certain changes and additions can be made thereto without departing from the scope and spirit of this invention. For example, a different number of recesses particular application. Different equivalent material of construction can be employed other than those specifically mentioned herein. These and other changes are intended to be within the contemplation of the inventors.

We claim:
1. Rotary valve apparatus for use in raising sunken vessels by the introduction of buoyant bodies therein comprising a submersible housing, a rotor mounted within said housing having a plurality of recesses at spaced positions around its periphery, each of said recesses being adapted to receive one of said bodies, intake tube means affixed to said housing for delivering said bodies one at a time to said recesses from a surface vessel, outlet means affixed to said housing at a spaced position from said intake tube means for delivering said bodies one at a time from said recesses externally of said housing, means for automatically turning said rotor stepwise to advance each of said recesses successively from a position adjacent said intake tube means to a position adjacent said outlet means, and exhaust means interconnectable with said recesses during the time the latter are being moved from said outlet means around to said intake means for removing water and the like from said recesses.

2. Rotary valve apparatus for use in raising sunken vessels by the introduction of buoyant bodies therein comprising a submersible housing, a rotor mounted within said housing having four recesses at spaced positions around its periphery, each of said recesses being adapted to receive one of said bodies, intake tube means affixed to said housing for delivering said bodies one at a time to said recesses from a surface vessel, outlet means affixed to said housing at a position ninety degrees along said periphery from said intake tube means for delivering said bodies one at a time from said recesses externally of said housing, means for automatically turning said rotor stepwise to advance each of said recesses successively from a position adjacent said intake tube means to a position adjacent said outlet means, and exhaust means interconnectable with said recesses during the time the latter are being moved from said outlet means around to said intake means for removing water and the like from said recesses.

3. Rotary valve apparatus for use in raising sunken vessels by the introduction of buoyant bodies therein comprising a submersible housing, a rotor mounted within said housing having four recesses at spaced positions around its periphery, each of said recesses being adapted to receive one of said bodies, intake tube means affixed to said housing for delivering said bodies one at a time to said recesses from a surface vessel, outlet means affixed to said housing at a position ninety degrees along said periphery from said intake tube means for delivering said bodies one at a time from said recesses externally of said housing, a pair of exhaust means each affixed to said housing at one hundred eighty and two hundred seventy degree positions along said periphery respectively for removing water from said recesses when adjacent said positions, and means for automatically turning said rotor stepwise to advance each of said recesses to successive positions adjacent said intake, outlet and exhaust means.

References Cited in the file of this patent

UNITED STATES PATENTS

| 189,233 | Knapp | Apr. 3, 1877 |
| 612,710 | Deterding | Oct. 18, 1898 |
| 630,542 | Jones | Aug. 8, 1899 |
| 908,016 | Lake | Dec. 29, 1908 |
| 1,772,709 | Culbertson | Aug. 12, 1930 |

FOREIGN PATENTS

| 622,900 | Great Britain | May 9, 1949 |

UNITED STATES PATENT OFFICE
CERTIFICATE OF CORRECTION

Patent No. 2,857,873                                                October 28, 1958

Clement F. Norelli et al.

It is hereby certified that error appears in the printed specification of the above numbered patent requiring correction and that the said Letters Patent should read as corrected below.

Column 3, line 70, beginning with "can be employed", strike out all to and including "of recesses", in line 71, same column, and insert instead -- vertion. For example, a different number of recesses can be employed as found necessary or desirable for any --.

Signed and sealed this 27th day of January 1959.

(SEAL)

Attest:

KARL H AXLINE                                                      ROBERT C. WATSON

AttestingOfficer                                                Commissioner of Patents